Jan. 31, 1950     F. R. KREEGER     2,495,935
CHILDREN'S VEHICLE

Filed Nov. 1, 1947     2 Sheets-Sheet 1

INVENTOR
FRED R. KREEGER
BY
Hyde, Meyer, Baldwin & Doran
ATTORNEYS

Jan. 31, 1950  F. R. KREEGER  2,495,935
CHILDREN'S VEHICLE
Filed Nov. 1, 1947  2 Sheets-Sheet 2

INVENTOR
FRED R. KREEGER
BY Hyde, Meyer, Baldwin & Doran
ATTORNEYS

Patented Jan. 31, 1950

2,495,935

UNITED STATES PATENT OFFICE 2,495,935

CHILDREN'S VEHICLE

Fred R. Kreeger, Shaker Heights, Ohio

Application November 1, 1947, Serial No. 783,501

3 Claims. (Cl. 280—87.01)

This invention relates to children's vehicles and more particularly, to a vehicle of wagon-like form which either may be pulled by a handle or propelled by the occupant through pushing impulses by one foot on the sidewalk or the like, the occupant being in a kneeling or equivalent position on the platform of the vehicle.

The present invention has for one of its objects the provision of such a vehicle which has improved steering means for use when the vehicle is self-propelled, the steering means being of such character as to enable steering of the vehicle to be easily and conveniently effected, in which the steering post and the manipulating means thereof are disposed at the front of the platform, thereby leaving the platform substantially uncumbered, and in which the turning radius of the vehicle, through the steering means, is short enough to enable the vehicle to be turned around on a relatively narrow sidewalk or the like and yet not so short as to make tipping of the vehicle likely to occur in the turning thereof.

A further object of the present invention is the provision of a vehicle of the character described which is provided with a detachable handle carried beneath the platform of the vehicle when the vehicle is self-propelled but which handle may be readily attached to the vehicle when pulling of the vehicle is desired.

A further object of the present invention is the provision of a vehicle of the character described having effectively disposed shock-absorbing cushioning means, thereby materially improving the riding qualities of the vehicle.

A further object of the present invention is the provision of a vehicle of the character described which is of strong and sturdy construction, which possesses maximum riding safety, and which is of exceedingly attractive appearance.

Further objects of the present invention, and some of its more important practical advantages, will be referred to in or will be evident from the following description of one embodiment of the invention, as illustrated in the accompanying drawings, in which Fig. 1 is a side elevational view of the vehicle;

Figure 1:
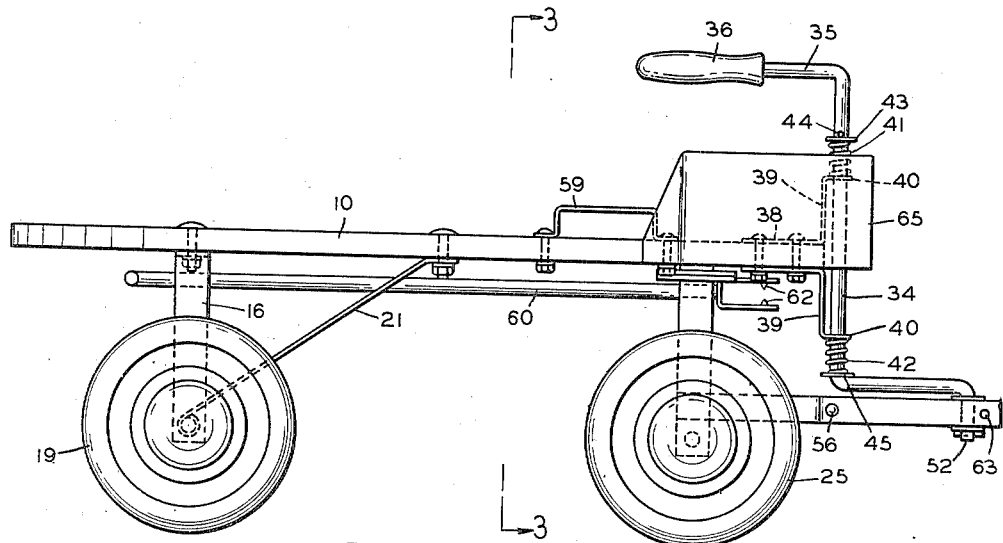

Before the vehicle here illustrated is specifically described, it is to be understood that the invention here involved is not limited to the structural details or the particular arrangement of parts here shown, as vehicles embodying the present invention may take various forms. It also is to be understood that the phraseology or terminology herein employed is for purposes of description and not of limitation, the scope of the present invention being denoted by the appended claims.

For the disclosure of one embodiment of the present invention, there is here illustrated a vehicle having a platform 10 which may be of any desired size, shape and material. As here shown, the platform 10 is made of wood and of elongated form, with straight and generally parallel side edge 11, a rounded rear edge 12, and forwardly and inwardly inclined front edges 13 separated by a transversely disposed extreme front edge 14.

For the support of the rear end portion of said platform any suitable wheeled support may be utilized. As here shown, the rear wheeled support for the platform 10 comprises a channel-shaped sheet metal bracket of strap-like form, the middle portion 15 of which is bolted or otherwise rigidly secured to the platform 10 and the two depending end portions 16 and 17 of which are suitably apertured to receive and carry an axle 18 having rotatably mounted on its projecting end portions the rear wheels 19 and 20 of the vehicle. For increased strength and rigidity, a brace or strut member 21 may be, and here is utilized, said brace or strut member being here shown as a sheet metal strap having its rear end clamped about the middle portion of the axle 18 and having its front end bolted to the platform 10.

The wheeled support for the front end portion of the platform 10 also may be of any suitable form. As here shown, it comprises a channel-shaped sheet metal bracket of strap-like form having a middle portion for securement to the platform and two depending end portions 22 and 23, said end portions being suitably apertured to receive and carry an axle 24 having rotatably mounted on its projecting end portions the front wheels 25 and 26 of the vehicle.

Figure 5:
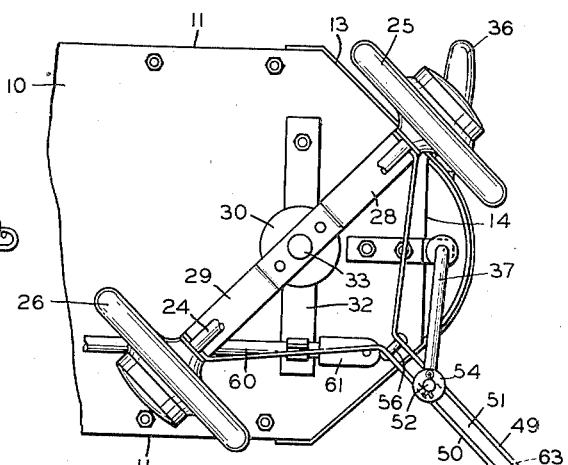
Fig. 5 is a view similar to Fig. 4 but with the front wheels turned to one side.

As here shown, the middle portion of this front bracket includes a straight section 27 and two sections 28 and 29 extending outwardly and downwardly therefrom and from which depend the axle-carrying end portions 22 and 23. In order to enable the vehicle to be turned by the steering means hereinafter described, the front wheeled support for the platform 10 is, of course, pivotally secured to said platform. For such purpose, in the present embodiment of the invention, the straight bracket section 27 has riveted or otherwise rigidly secured to its upper surface a metal disc 30 for bearing engagement with, and turning movement relative to, a like metal disc 31 welded or otherwise rigidly secured to a transverse metal strap 32 which is bolted or otherwise suitably secured to the lower surface of the platform 10 as best shown in Fig. 5. Extending through the disc 31 and through the bracket section 27 and its disc 30 is a pivot pin 33 about which the front wheeled support turns and by means of which pin such support is pivotally secured to the platform 10. If desired and as here shown, said pivot pin may be of rivet-like form, with its upper head (not shown) lying in a recess of the disc 31 and confined therein by the overlying strap 32.

For steering purposes, when the vehicle is self-propelled in the manner hereinafter described, a substantially vertical steering post 34 is mounted at the front end of the platform 10, at the middle of its transverse front edge 14. At its upper end, said steering post is provided with suitable manipulating means, which may be, and here is, a handle-forming a rearward extension 35 of said post, said handle preferably being provided with a suitable hand grip 36 for convenient manipulation, as shown. At its lower end, the steering post is integrally or otherwise suitably provided with a forwardly extending crank arm 37 having cooperative engagement, as will hereinafter appear, with the pivotally mounted front wheeled support for the platform 10.

For the mounting of said steering post, there is here secured to the upper and lower surfaces of the front end portion of the platform 10 suitable sheet metal brackets, as best shown in Fig. 1. In the present embodiment of the invention, each of said brackets comprises a forwardly extending base portion 38 bolted or otherwise rigidly secured to the platform 10, a vertically disposed intermediate portion 39 (the intermediate portion of the upper bracket extending upwardly and the intermediate portion of the lower bracket extending downwardly), and a forwardly extending, generally horizontal end portion 40 which projects beyond the platform, the two end portions 40 being provided with vertically aligned apertures to slidingly receive the steering post 34.

Figure 3:
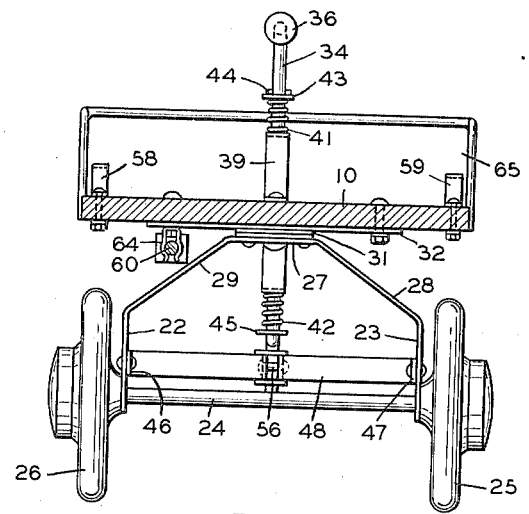
Fig. 3 is a vertical sectional view on the line 3—3 of Fig. 1.

To provide a yielding mounting for the steering post and thereby to cushion shocks and jars which otherwise would be transmitted to the handle 35 thereof when the vehicle is traveling over a rough surface or when it strikes an abutment, upper and lower coiled compression springs 41 and 42 are here provided. As best shown in Figs. 1 and 3, these shock-absorbing cushioning springs surround the steering post 34, with the upper spring 41 being confined between the forwardly extending front end portion 40 of the upper steering post bracket and an abutment with which the steering post is provided, such as a washer 43 and a supporting cotter pin 44, and with the lower spring 42 being confined between the forwardly extending front end portion 40 of the lower steering post bracket and a washer 45 resting on the steering post crank arm 37.

Therefore, if the front end portion of the vehicle suddenly drops, the resulting shock which otherwise would be transmitted to the steering post handle 35 is cushioned by the compression of the upper spring 41, and if the front end portion of the vehicle suddenly rises, the resulting shock which otherwise would be transmitted to said steering post handle is cushioned by the compression of the lower spring 42, all as will be readily understood.

Figure 2:
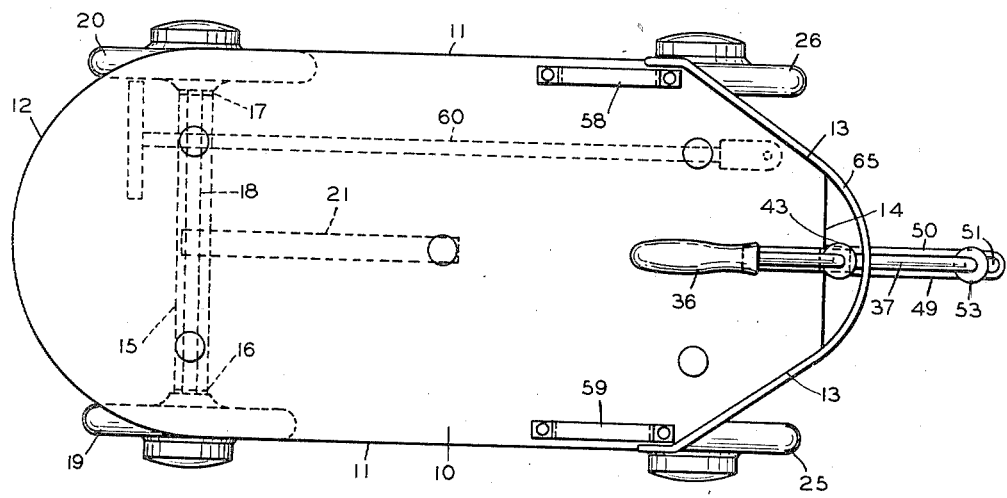
Fig. 2 is a top plan view thereof.
Figure 4:
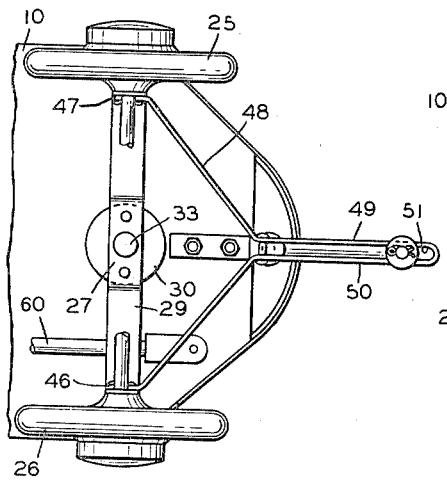
Fig. 4 is a bottom plan view of the front end portion of the vehicle.

To provide the aforesaid cooperative engagement, for steering purposes, between the steering post crank arm 37 and the pivotally mounted front wheeled support for the platform 10, there is here welded or otherwise rigidly secured to the axle-carrying end portions 22 and 23 of the front wheeled support the rear end portions 46 and 47 of a forwardly extending sheet metal strap 48. As shown in Figs. 2, 4 and 5, the front portion of such strap is suitably bent to provide two closely spaced parallel arm portions 49 and 50 which define therebetween a relatively narrow slot 51, the longitudinal axis of which normally coincides with the longitudinal axis of the platform 10. Extending into this slot 51 is the down-turned front end portion 52 of the steering post crank arm 37, and to confine said crank arm end portion in such slot, said end portion is here provided above and below the slot-forming strap arm portions 49 and 50 with washers 53 and 54, the upper washer 53 having upward bearing engagement against the crank arm 37 and the lower washer 54 having downward bearing engagement against a cotter pin 55 or the like secured to the crank arm end portion 52.

As the result of this interlocking, motion-transmitting connection of the steering post crank arm with the slot-forming arm portions 49 and 50 of the forwardly extending strap 48 of the pivotally mounted front wheeled support, said support is easily and conveniently turned to one side upon lateral swinging movement of the crank arm as a consequence of turning movement of the steering post 34 about its vertical axis, as will be readily understood.

As shown in Fig. 4, when the front wheeled support is in its normal "straight ahead" position, the depending end portion 52 of the crank arm 37 is substantially at the closed front end of the strap slot 51 of such front wheeled support. As the steering post 34 is turned about its vertical axis, with corresponding lateral swinging movement of the steering post crank arm 37, the depending front end portion 52 of said crank arm moves rearwardly in the strap slot 51, as best shown in Fig. 5, with resultant turning movement of the front wheeled support about its pivotal axis 33, as heretofore mentioned. In order to limit the extent to which the front wheeled support may be turned by turning movement of the steering post, to thereby avoid any tendency of the vehicle to tip in turning, a rearward stop for the crank arm end portion 52 is provided in the strap slot 51, as best shown in Figs. 4 and 5. In the present embodiment of the invention, such stop comprises a rivet 56 connecting the slot-forming strap arm portions 49 and 50, and although such rivet is here located at substantially the rear end of said slot, to enable the vehicle to be turned around on even a relatively narrow sidewalk, the location of such rivet may be a more advanced one, if a longer turning radius is desired.

Inasmuch as the turning radius of the front wheeled support is considerably less than that of the turning radius of the steering post handle 35 (as will be evident from a comparison in Fig. 5 of the relative extents to which the steering post handle and the front wheeled support have been turned), but little effort is required to turn the front wheeled support, even though the handle 35 is relatively short and the leverage therefore not great. As the present vehicle is primarily for self-propelled use, this ease in steering is of considerable importance, as will be readily understood.

In the use of the vehicle in a self-propelled manner, the occupant merely rests his right (or left) knee on the platform 10, with his right (or left) hand grasping the hand grip 36 of the steering post handle, and by pushing impulses against the sidewalk or the like with his left (or right) foot, propels the vehicle forwardly. For added convenience and safety, the upper surface of the platform 10 may be, and here is provided adjacent its side edges 11 with suitable hand holds 58 and 59 (Figs. 1, 2 and 3), the left one 58 being grasped when the occupant's right hand is steering the vehicle and the right one 59 being grasped if the occupant is steering with his left hand.

Figure 6:
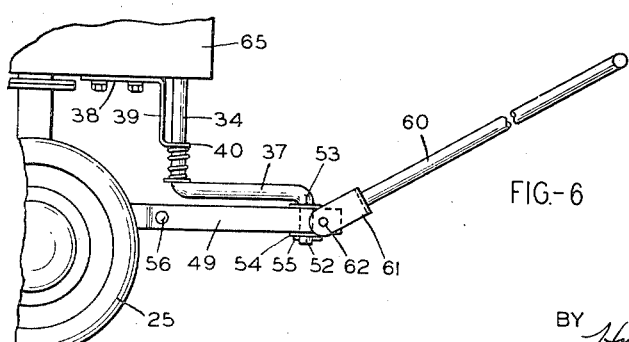
Fig. 6 is a side elevational view of the front end portion of the vehicle and showing the pull handle detachably secured thereto.

In order to enable the vehicle to be pulled when desired, the vehicle includes a handle 60 (Fig. 6) adapted for simple, easy and convenient connection to and disconnection from the forwardly projecting strap arm portions 49 and 50 of the front wheeled support. As here shown, the handle 60 is provided at its rear end with a clevis 61, the two arms of which are of resilient character and carry inwardly extending prongs 62 for detachable connection with the strap arm portions 49 and 50, arm portions which are provided adjacent their front ends with apertures 63 to receive such prongs, as in Fig. 6. In order that such handle 60 will always be available when its use is desired, and yet be out of the way when the vehicle is self-propelled in the manner heretofore described, the lower surface of the platform 10 is provided with spring clips 64 or equivalent devices for the support of the handle beneath said platform, as shown in Figs. 1 to 5 inclusive.

Preferably and as here shown, an upright band or shield 65 is provided at the front of the platform 10, a band or shield which adds to the appearance of the vehicle and yet does not interfere with or make less convenient the use of the vehicle in a self-propelled manner.

To those skilled in the art to which the present invention relates, other features and advantages of vehicles embodying the invention will be evident from the foregoing description of one such embodiment.

What I claim is:

1. In a vehicle having a body structure and a front axle structure pivotally connected to said body structure, steering means for said front axle structure, said steering means comprising a generally upright steering post mounted for turning movement about its longitudinal axis, upper and lower brackets secured to said body structure and through which brackets said steering posts extends, upper and lower resilient means providing a resilient mounting for said steering post, said upper resilient means being confined between and abutting said upper bracket and an abutment on said steering post and said lower resilient means being confined between and abutting said lower bracket and an abutment on said steering post, said steering post having a forwardly extending crank arm rigidly connected thereto and having lateral swinging movement as the steering post is turned about its longitudinal axis, and means providing a pin and slot connection between said crank arm and said front axle structure, whereby upon turning movement of said steering post about its longitudinal axis, with corresponding lateral swinging movement of said crank arm, the front axle structure is correspondingly turned.

2. In a vehicle having a body structure and a front axle structure pivotally connected to said body structure, steering means for said front axle structure, said steering means comprising a generally upright steering post mounted for turning movement about its longitudinal axis, upper and lower brackets secured to said body structure and having forwardly projecting portions through which the steering post extends, upper and lower compression springs surrounding said steering post and providing a resilient mounting therefor, said upper compression spring being confined between and abutting the projecting portion of said upper bracket and an abutment on said steering post and said lower compression spring being confined between and abutting the projecting portion of said lower bracket and an abutment on said steering post, said steering post having a forwardly extending crank arm rigidly connected thereto and having lateral swinging movement as the steering post is turned about its longitudinal axis, and means providing a pin and slot connection between said crank arm and said front axle structure, whereby upon turning movement of said steering post about its longitudinal axis, with corresponding lateral swinging movement of said crank arm, the front axle structure is correspondingly turned.

3. In a vehicle having a body structure and a front axle structure pivotally connected to said body structure, steering means for said front axle structure, said steering means comprising a generally upright steering post mounted for turning movement about its longitudinal axis, bracket means carried by said body structure and through which said steering post extends, said steering post having a forwardly extending crank arm rigidly connected thereto and having lateral swinging movement as the steering post is turned about its longitudinal axis, means providing a pin and slot connection between said crank arm and said front axle structure, whereby upon turning movement of said steering post about its longitudinal axis, with corresponding lateral swinging movement of said crank arm, the front axle structure is correspondingly turned, and resilient means confined between said bracket means and said crank arm and providing a resilient mounting for said steering post.

FRED R. KREEGER.

REFERENCES CITED

The following references are of record in the file of this patent:

UNITED STATES PATENTS

| Number | Name | Date |
| --- | --- | --- |
| 921,161 | Rand | May 11, 1909 |
| 927,238 | Henle | July 6, 1909 |
| 1,286,294 | Griswold | Dec. 3, 1918 |
| 1,644,535 | Mayer | Oct. 4, 1927 |
| 1,816,691 | Notzke | July 28, 1931 |